US009650988B2

(12) United States Patent
Schneider

(10) Patent No.: US 9,650,988 B2
(45) Date of Patent: May 16, 2017

(54) PISTONS WITH COMPLEX SHAPED PISTON CROWNS AND MANUFACTURING PROCESSES

(71) Applicant: FEDERAL-MOGUL CORPORATION, Southfield, MI (US)

(72) Inventor: Norbert G. Schneider, Ann Arbor, MI (US)

(73) Assignee: Federal-Mogul LLC, Southfield, MI (US)

( * ) Notice: Subject to any disclaimer, the term of this patent is extended or adjusted under 35 U.S.C. 154(b) by 0 days.

(21) Appl. No.: 14/968,415

(22) Filed: Dec. 14, 2015

(65) Prior Publication Data

US 2016/0097342 A1 Apr. 7, 2016

Related U.S. Application Data

(63) Continuation of application No. 14/182,165, filed on Feb. 17, 2014, now Pat. No. 9,243,582.

(Continued)

(51) Int. Cl.
*F02F 3/22* (2006.01)
*F02F 3/26* (2006.01)
(Continued)

(52) U.S. Cl.
CPC .......... *F02F 3/22* (2013.01); *F02B 23/0681* (2013.01); *F02F 3/003* (2013.01); *F02F 3/0015* (2013.01);
(Continued)

(58) Field of Classification Search
CPC .... F02F 3/0015; F02F 3/18; F02F 3/26; F02F 3/28; F02F 3/285; F02B 23/06; F02B 23/0678; F02B 23/0681; F16J 1/005; B23P 15/08; B23P 15/10; B21K 1/18; B21K 1/185
(Continued)

(56) References Cited

U.S. PATENT DOCUMENTS 4,581,983 A * 4/1986 Moebus ............... B23K 35/004
123/193.6
5,245,752 A * 9/1993 Lippai ..................... B23P 15/10
123/193.6
(Continued)

FOREIGN PATENT DOCUMENTS

CN 1685143 A 10/2005
CN 101365559 A 2/2009
(Continued)

*Primary Examiner* — Grant Moubry
(74) *Attorney, Agent, or Firm* — Robert L. Stearns; Dickinson Wright, PLLC

(57) ABSTRACT

A steel piston with an oil gallery, and process for forming a steel piston oil gallery channel, which corresponds to the complex shape of the combustion bowl in the piston crown. The piston crown is made by a cast metal or powder metal forming process. The oil gallery channel is formed to the basic shape that corresponds to the shape of the walls of the combustion bowl. Machine-turning surfaces in the oil gallery channel can be machine-finished as desired. Surfaces in the oil gallery which cannot be machined with conventional turning operations, such as recesses and protrusions into the channel, are left in the original as-formed condition.

5 Claims, 4 Drawing Sheets

Related U.S. Application Data

(60) Provisional application No. 61/766,055, filed on Feb. 18, 2013.

(51) Int. Cl.
*F02F 3/00* (2006.01)
*F02B 23/06* (2006.01)

(52) U.S. Cl.
CPC .............. *F02F 3/26* (2013.01); *Y02T 10/125* (2013.01); *Y10T 29/49249* (2015.01)

(58) Field of Classification Search
USPC .... 123/193.6, 197.2; 92/172, 173, 174, 186; 29/888.04, 888.042, 888.041, 888.049
See application file for complete search history.

(56) References Cited

U.S. PATENT DOCUMENTS

| | | | | |
|---|---|---|---|---|
| 6,286,477 B1* | 9/2001 | Yang | ...................... | F02B 23/104 |
| | | | | 123/263 |
| 6,474,220 B2* | 11/2002 | Ries | ......................... | B23P 15/10 |
| | | | | 29/558 |
| 6,588,396 B1* | 7/2003 | Cleary | .................. | F02B 23/104 |
| | | | | 123/276 |
| 6,698,391 B1 | 3/2004 | Kemnitz | | |
| 6,698,392 B1 | 3/2004 | Koehnert et al. | | |
| 6,928,997 B2* | 8/2005 | Yu | ......................... | F02B 23/104 |
| | | | | 123/193.6 |
| 6,938,603 B2* | 9/2005 | Scharp | ..................... | F02F 3/22 |
| | | | | 123/193.1 |
| 7,005,620 B2* | 2/2006 | Ribeiro | ................... | F02F 3/003 |
| | | | | 219/635 |
| 7,185,614 B2* | 3/2007 | Meffert | ............... | F02B 23/0672 |
| | | | | 123/269 |
| 7,318,406 B2* | 1/2008 | Yi | ......................... | F02B 17/005 |
| | | | | 123/276 |
| 7,380,536 B2* | 6/2008 | Issler | .................. | F02B 23/0621 |
| | | | | 123/276 |
| 7,971,568 B2* | 7/2011 | Lee | ....................... | F02B 17/005 |
| | | | | 123/193.6 |
| 7,987,831 B2* | 8/2011 | Seifried | ................. | B23B 27/04 |
| | | | | 123/193.6 |
| 8,528,206 B2* | 9/2013 | Scharp | .................. | B21K 1/185 |
| | | | | 123/193.6 |
| 8,943,687 B2* | 2/2015 | Scharp | .................. | B21K 1/185 |
| | | | | 123/193.6 |
| 2005/0172926 A1* | 8/2005 | Poola | .................. | F02B 23/0672 |
| | | | | 123/193.6 |
| 2006/0207424 A1* | 9/2006 | Gaiser | ..................... | F02F 3/003 |
| | | | | 92/222 |
| 2008/0127818 A1* | 6/2008 | Dye | ........................ | B21K 1/18 |
| | | | | 92/186 |
| 2010/0299922 A1 | 12/2010 | Gniesmer et al. | | |
| 2012/0222305 A1 | 9/2012 | Scharp et al. | | |

FOREIGN PATENT DOCUMENTS

CN    202348466 U    7/2012
JP    2006500505 A    1/2006

\* cited by examiner

PISTONS WITH COMPLEX SHAPED PISTON CROWNS AND MANUFACTURING PROCESSES

CROSS-REFERENCE TO RELATED APPLICATIONS

This U.S. Continuation Application claims the benefit of U.S. Utility application Ser. No. 14/182,165, filed Feb. 17, 2014, which claims the benefit of U.S. Provisional Application Ser. No. 61/766,055, filed Feb. 18, 2013, which are each incorporated herein by reference in their entirety.

TECHNICAL FIELD

The invention relates generally to pistons for internal combustion engines, particularly diesel engines, and more particularly to pistons having oil galleries.

BACKGROUND

It is known in internal combustion engine applications, particularly with respect to diesel engines, to provide pistons with bodies formed with a closed gallery for cooling oil. The oil circulates through the gallery and cools parts of the piston which are susceptible to damage from the heat of combustion. The upper rims around the combustion bowls are particularly susceptible to damage when overheated.

The cooling galleries are generally annular or ring-shaped with constant cross-sections and are provided inside the piston ring belt and adjacent the top wall and rim of the piston body. The gallery is bounded by an inner wall adjacent the combustion bowl. The oil galleries can be either open or closed. If closed, the gallery channel is closed at the bottom by a bottom wall. For closed galleries, inlets can be provided in the bottom wall for receiving cooling oil into the gallery, or the cooling oil could be supplied to the galleries by other means.

Traditionally, the combustion bowls of diesel engines have circular symmetric shapes and have smooth unbroken surfaces from the outer rims to the depressed center portions. Today, however, new bowls are being designed with non-traditional or complex shapes. It is understood that these non-traditional shapes are utilized in order to burn fuel more effectively and with less undesirable emissions. However, the complex bowl shapes makes the cooling of the bowls and rims with conventional piston galleries more difficult. Conventional machining with turning operations will not provide oil galleries with similar or corresponding complex shapes as the complex shaped combustion bowls.

If the differences in structure between the combustion bowls and the oil galleries create walls with significantly different thicknesses, or walls which are too thick to be adequately cooled by the oil being circulated in the oil galleries, then "hot spots" in the piston can occur where the material can overheat. Hot spot areas can create weak spots in the piston where the material could crack or fail. If a piston fails, this creates an engine failure causing major expense and perhaps a new engine for the vehicle.

It is an object of the present invention to provide piston crowns made by cast metal or powder metal processes with oil galleries, and a method of forming such oil galleries, which accommodates non-traditional complex-shaped combustion bowls and maintains thin and uniform wall thickness in order to avoid overheating concerns.

SUMMARY OF THE INVENTION

The invention provides oil galleries for cast metal and powder metal pistons with complex shaped combustion bowls, as well as methods for forming such oil galleries, which provide substantially uniform wall thickness between the combustion bowls and the oil galleries. The invention minimizes or eliminates hot spots and allows the oil in the galleries to maintain the rims and other areas of the pistons and combustion bowls within acceptable temperature limits.

The galleries are formed in the same or substantially similar complex shapes as the combustion bowls. The galleries are formed by cast metal processes or powder metal processes and then machined by conventional turning operations where possible to enlarge the galleries and to finish certain surfaces. Areas and surfaces in the galleries which cannot be finished by conventionally machine turning operations, such as recesses and bulges, are left in their initial condition. During the machine turning, an annular groove is formed extending the shape of the oil gallery in a direction toward the bowl rim.

The term "complex" as used herein refers to the shape of the combustion bowl in the piston crown which is not traditionally shaped, either in its outer perimeter, or inside the outer perimeter, or both. "Complex" shapes refers to all shapes of a combustion bowl other than traditional and which can have, for example, edges which include straight, curved, or arced sections, or which have bumps, protrusions, ribs, recesses and the like either in the bowl or, its outer perimeter, or both. In general, complex shapes are any shapes which are not machineable by conventional machine-turning operations.

The present invention is preferably utilized for pistons for diesel engines, although the invention can also be utilized for pistons for any internal combustion engine and for engines that use either liquid or gas fuel.

Once the crown of the piston if formed, the crown is attached to a second portion of the piston in order to complete the full piston. The second portion typically includes the remainder of the side walls and the pin bores. The crown and second portion are connected together in any known manner, but preferably by friction welding. A connection process of this type is disclosed, for example, in U.S. Pat. No. 6,260,472.

BRIEF DESCRIPTION OF THE DRAWINGS

These and other features and advantages of the present invention will become more readily appreciated when considered in connection with the following detailed description and appending drawings, wherein.

DESCRIPTION OF THE PREFERRED EMBODIMENTS

Figure 1:
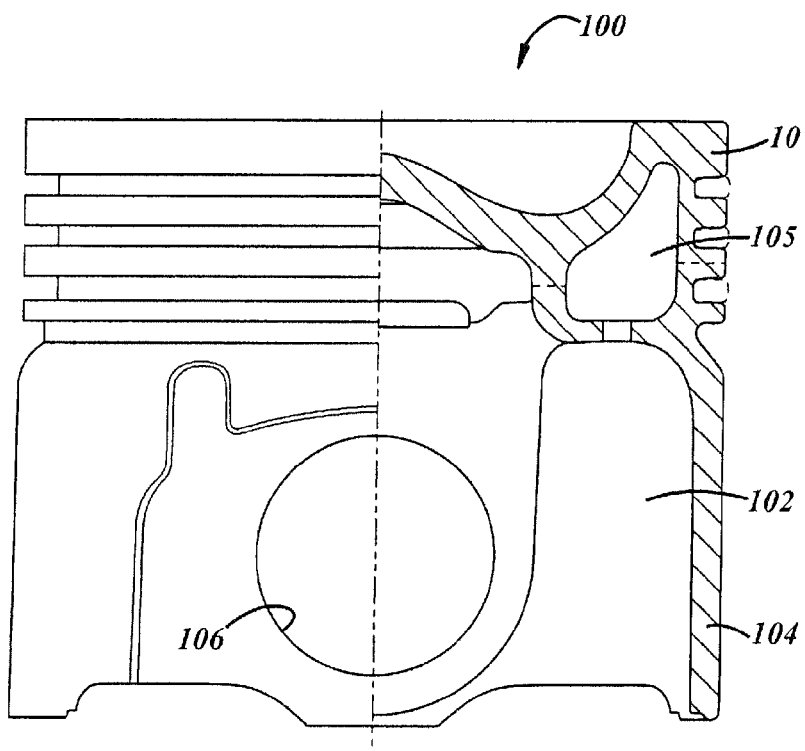
FIG. 1 illustrates a piston with a closed oil gallery.

A representative piston 100 in which the present invention can be utilized if the combustion bowl has a complex shape is shown in FIG. 1. The piston 100 includes a piston crown member 10 and a lower member 102 which includes sidewalls 104 and pin bosses 106. The piston crown 10 and lower member 102 are fixedly secured together, preferably by friction welding, to form the complete piston 100.

The piston 100 has an oil gallery in which oil is circulated in order to maintain the temperature of the piston, particularly the upper surface, combustion bowl and outer rim within acceptable temperature limits. The oil gallery includes an oil gallery channel 105 positioned in the crown member 10. The oil gallery can be either opened or closed as well known in the art. If closed, the bottom wall of the oil gallery is typically included as part of the lower member 102.

Figure 3:
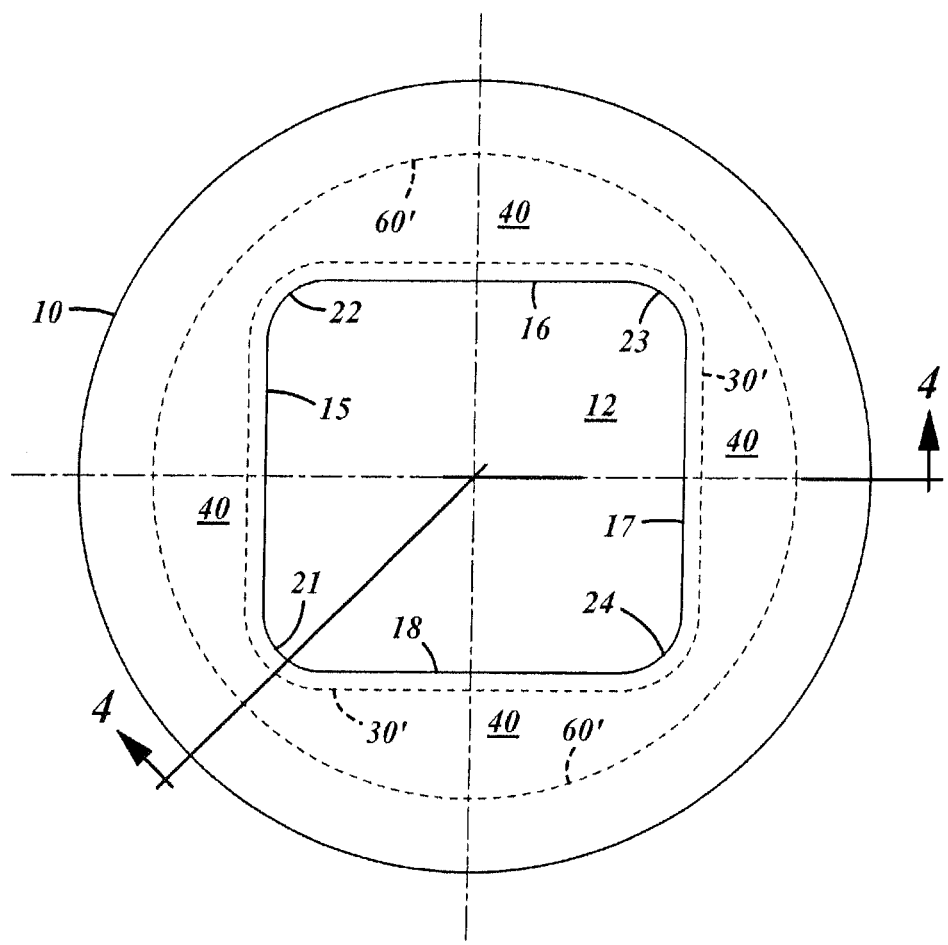
FIG. 3 is a schematic plan view of a piston crown depicting a representative complex shape of a combustion bowl.

A piston crown member 10 with a representative complex combustion bowl 12 is depicted in FIG. 3. The shape of the bowl 12 is essentially a square shape with four sides 15, 16, 17 and 18. In the shape depicted, the sides are straight with rounded corners 21, 22, 23 and 24.

It is to be understood that the shape of the combustion bowl and the linearity of the sides 15-18 is merely one example of a complex combustion bowl. In accordance with the invention, the combustion bowl can have any perimeter or internal shape, with any number of sides or side portions. The sides and internal surfaces can also have any shape, such as being straight as shown or curved or arced, and can have sections or portions which are straight, curved or arced, or have bumps, protrusions, recesses, ribs and the like. In addition, the corners 21-24, or the intersections or joints between the side portions, can have any shape, and can protrude into the bowl or be recessed from it.

Figure 2A:
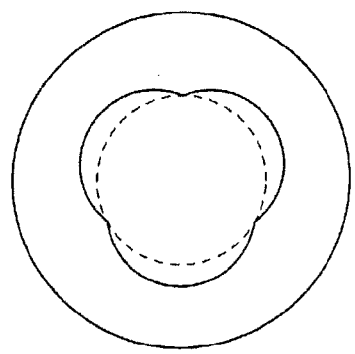
FIGS. 2A, 2B and 2C schematically illustrate three general types of complex combustion bowls.
Figure 2B:
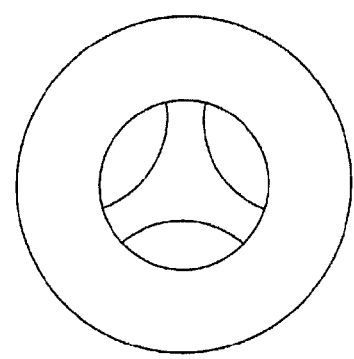
Figure 2C:
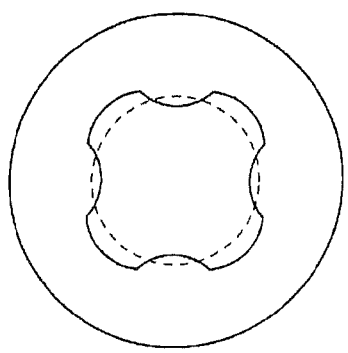

The shape of the piston bowl can be complex either in its outer periphery, as shown in FIG. 2A, be complex in the radially inner areas of the bowl, as shown in FIG. 2B, or be complex with respect to both the outer periphery and the inner areas as shown in FIG. 2C. FIGS. 2A, 2B and 2C are representative of these three general types of complex shaped combustion bowls. The present invention provides an oil gallery and oil gallery channel that can accommodate combustion bowls with such complex shapes.

The piston crown and the entire piston are made of a cast metal or powder metal material. The shape of the piston crown 10 is formed by these processes. In the embodiment shown, the oil gallery channel is made by the cast metal or powder metal process, followed by a machining process.

Figure 4:
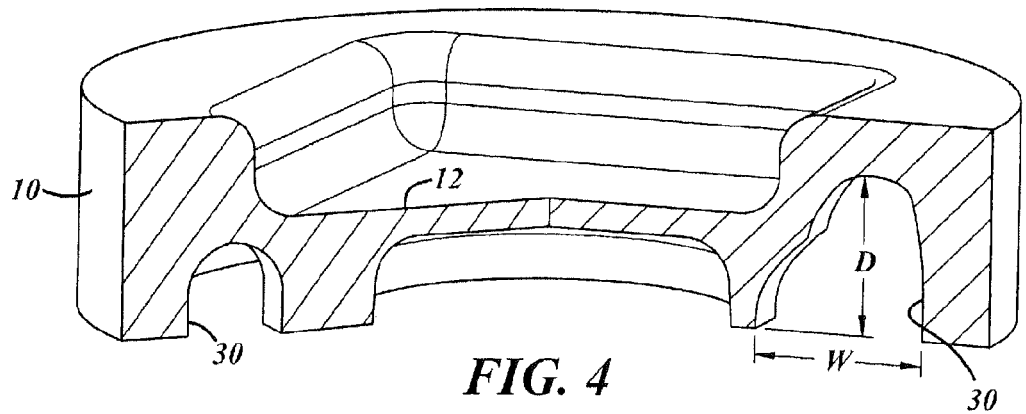
FIG. 4 is a cross-section of the piston crown as shown in FIG. 1 taken along line 4-4 and in direction of the arrows.

A cross-section of the piston crown 10 after it is initially formed is shown in FIG. 4. The processes form an annular groove 30 that does not necessarily have a circumferential uniform width "W" or a uniform depth "D". The width of the groove 30 is greater in the portions where the sides of the combustion bowl are furthest from the outside surface of the piston crown. These areas are designated by the numeral 40 in FIG. 3. Similarly, the areas where the groove 30 is the narrowest is at the corners or intersections between the side portions.

Figure 5:
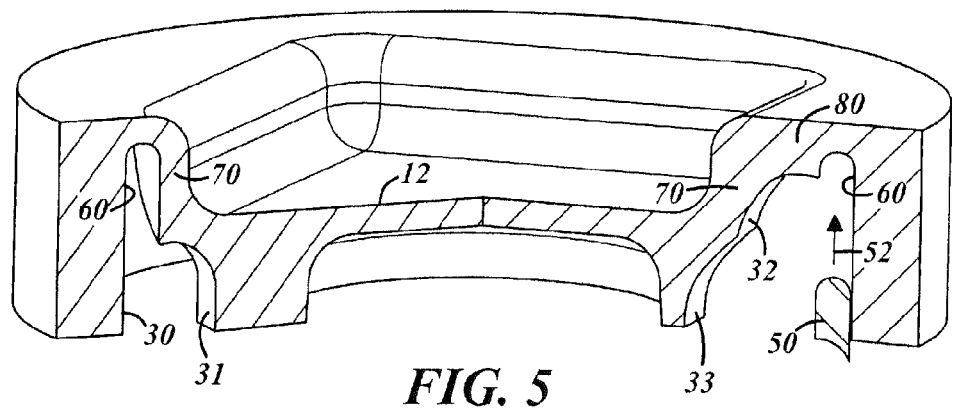
FIG. 5 is another cross-section of the piston crown similar to FIG. 4, following machining-turning of at least one surface of the oil gallery.

As a subsequent step in forming the oil galleries in accordance with a preferred embodiment of the invention, the shape of the oil gallery is machined to the shape shown in FIG. 5. In one step in the machine processing, a machining tool represented by the member 50 is inserted into the oil gallery 30 (in the direction of arrow 52) and used to finish the outer surface of the oil gallery channel and to form an annular groove 60, entirely around the bowl. This machine-turning extends the oil gallery channel into the upper reaches of the piston crown (near the top ring groove and adjacent the top face or rim 80 of the piston). The groove 60, which is fully machined, extends above the initial channel 30.

"Machine-turning" or simply "turning" is a machining process in which a cutting tool, typically a non-rotary tool bit, moves linearly while the workpiece rotates, such as on a lathe. "Machine-turning" can refer to such a cutting or finishing operation on either the internal surfaces or the external surfaces of a workpiece. In machining some of the surfaces of an oil gallery channel thereon, the machine-turning finishes or forms internal surfaces.

The machine-turning processing can also be used to machine and finish some of the inner surfaces of the oil gallery channel 30, such as surface 31. Due to the complex shape in the oil gallery in order to follow the complex shape of the combustion bowl, a plurality of bumps or recesses can be formed on the inside gallery surface by the initial casting or powder forming processes. Due to the turning procedure used in the machining process, the recesses and areas between bumps are left unfinished (i.e. not machined) in this step. Inner gallery channel surfaces 32 and 33 in FIG. 5 are not finished and remain in their original condition.

In FIG. 3, the outer circumference of the finished annular groove 60 is indicated by hidden line 60'. In addition, an inner finished surface of the complex shaped oil gallery (such as surface 31) is indicated by the hidden line 30'. The areas (e.g. recesses) left unfinished are indicated by the reference numerals 32 and 33 in FIG. 5. An oil gallery channel having the shape 30 shown in FIG. 4 can be formed by cast metal or powdered metal processes.

In a typical forging operation, the oil gallery channel in the lower surface of the piston crown member 10 will be formed at the same time that another forging die is forming the complex shaped combustion bowl on the upper surface or upper side of the piston crown member.

The inventive process provides an annular oil gallery for a piston which has a similar or substantially the same perimeter inner shape as the outer perimeter shape of a complex-shaped combustion bowl. This minimizes the thicknesses of the wall areas 70 between the oil gallery and combustion bowl 12 and makes the wall thicknesses around the outside of the combustion bowl uniform. Due to practical limits of the forming and machining processes, the thicknesses of all of the walls will not be exactly the same around the circumference of the combustion bowl. The present invention, however, makes the wall thickness 70 as thin and uniform as practical around the entire oil gallery. This allows oil introduced in the oil gallery when the piston is finished to maintain the temperature of the bowl wall surfaces and rim 80 within appropriate limits and avoids harmful hot spots.

With the present invention, thick wall sections which can create hot spots are minimized or eliminated. Areas of a piston which overheat (also called "hot spots") can create weak spots that could crack or fail. Failure of pistons in this manner could lead to expensive repairs, and possibly to the replacement of the engine.

Preferred cooling for a piston can be provided when the walls have a uniform thickness and are relatively thin. Pistons with thinner walls also have less weight which provides less strain on the engine. This results in better gas mileage and less harmful emissions.

Figure 6:
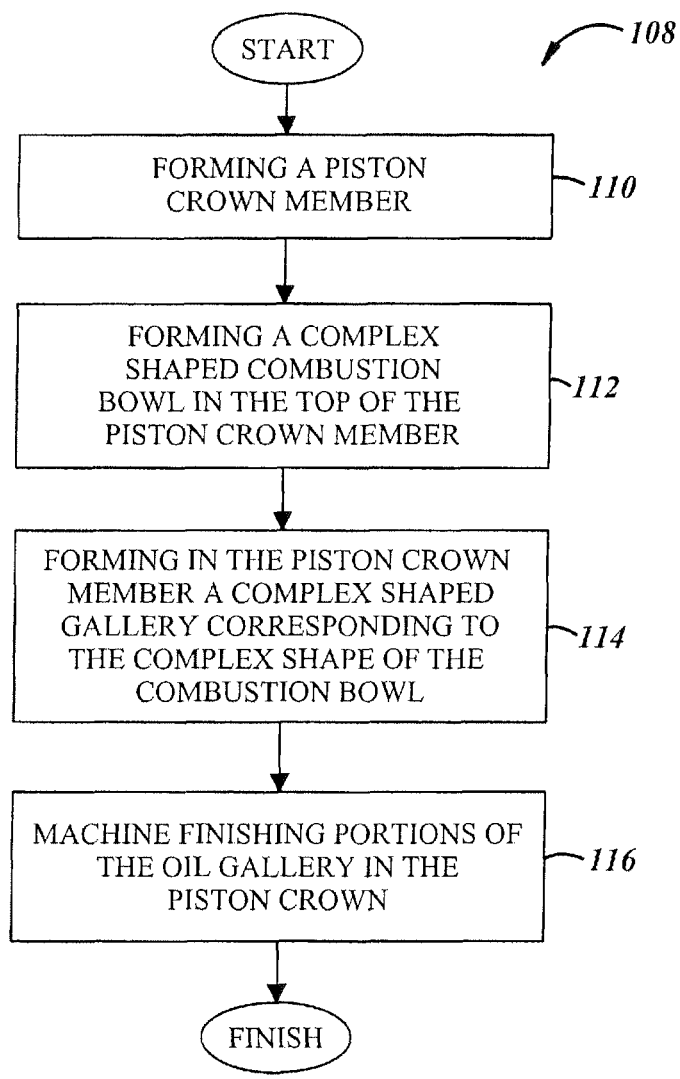
FIG. 6 is a flow chart of an embodiment of a system and method in accordance with the present invention.

FIG. 6 presents a flow chart 108 of the preferred method of forming an oil gallery channel in a piston crown that corresponds in shape to the shape of a complex combustion bowl in the piston crown. First, a piston crown member is made of a steel material 110. This can be done by any conventional manufacturing procedure.

Then, a complex shaped combustion bowl is formed in the top or upper surface of the piston crown member 112. This step is formed by a cast metal or powdered metal process.

At the same time, an oil gallery channel 30 is formed in the lower surface or lower side of the piston crown member with a shape that is similar to, or corresponds to, the shape of the combustion bowl. This is shown in box 114.

Finally, the oil gallery channel in the piston crown member is machine finished 116 to enlarge its size and bring it closer to the upper rim of the piston crown member and the combustion bowl. In this step, an annular groove 60 is formed by a cutting tool, and the other surfaces of the gallery channel which can be finished by a machine-turning operation (i.e. other than recesses and areas between bumps) can be finished as desired.

Although the invention has been described with respect to preferred embodiments, it is to be also understood that it is not to be so limited since changes and modifications can be made therein which are within the full scope of this invention as detailed by the following claims.

What is claimed is:

1. A piston comprising:
    a lower member, said lower member comprising sidewalk portions and pin bores;
    an upper crown member joined to said lower member, said upper crown member having a combustion bowl on an upper side thereof and an oil gallery recess on a lower side thereof, wherein said combustion bowl includes a plurality of radially inwardly or outwardly projecting protrusions spaced circumferentially from one another, and wherein said oil gallery recess includes machined portions and un machined portions.

2. The piston of claim 1, wherein said machined portions are radially spaced from said protrusions.

3. The piston of claim 1, wherein said combustion bowl has a shape and said oil gallery recess of said upper crown member has a radially inner wall with a shape corresponding to said shape of said combustion bowl.

4. The piston of claim 1 including an outer rim surrounding said combustion bowl, a ring belt depending from said outer rim, said cooling gallery recess being disposed radially inwardly of said ring belt, and wherein said upper crown member has a substantially uniform thickness along said cooling gallery.

5. The piston of claim 1 including an outer rim surrounding said combustion bowl, a ring belt depending from said outer rim, and a cooling gallery disposed radially inwardly of said ring belt and formed by said oil gallery recess of said upper crown member and by said lower member; and wherein said upper crown member has a substantially uniform thickness along said cooling gallery;
    said machined portions being located on an outer wail portion of said oil gallery radially opposite said protrusions;
    said lower surface of said upper crown member having an inner wall with a shape being the same as a shape of said combustion howl and such that said upper crown member has a uniform thickness along said cooling gallery;
    said upper crown member and said lower crown member being formed of steel and being welded together; and wherein
    said lower member provides a bottom wall of said cooling gallery.

\* \* \* \* \*